United States Patent [19]
Fry

[11] Patent Number: 5,433,194
[45] Date of Patent: Jul. 18, 1995

[54] DRAIN VALVE FOR PRESSURIZED GAS SYSTEM

[76] Inventor: Stanley E. Fry, 1474 Matterhorn Dr., Riverside, Calif. 92506

[21] Appl. No.: 58,411

[22] Filed: May 7, 1993

[51] Int. Cl.⁶ .................. A62B 7/10; A62B 19/00; A62B 23/02
[52] U.S. Cl. .................. 128/205.12; 128/205.27; 128/205.24
[58] Field of Search .................. 128/205.12, 205.24, 128/200.24, 204.16, 204.18, 205.27, 912

[56] References Cited

U.S. PATENT DOCUMENTS

| | | | |
|---|---|---|---|
| 2,007,358 | 7/1935 | Anger | 303/88 |
| 2,100,485 | 11/1937 | Lindemann | 137/103 |
| 2,125,144 | 7/1938 | Aikman | 303/88 |
| 2,912,998 | 11/1959 | Hursen | 137/474 |
| 2,939,477 | 6/1960 | Kaldobsky | 137/204 |
| 3,102,537 | 9/1963 | Bartlett, Jr. | 128/142 |
| 3,454,005 | 7/1969 | Eubanks et al. | 128/186 |
| 4,417,574 | 11/1983 | Talonn et al. | 128/205.12 |
| 4,430,994 | 2/1984 | Clawson et al. | 128/203.27 |
| 4,457,305 | 7/1984 | Shanks et al. | 128/205 |
| 4,867,153 | 9/1989 | Lorenzen et al. | 128/205.12 |
| 5,101,821 | 4/1992 | Carie, Jr. | 128/205.12 |

*Primary Examiner*—Kimberly L. Asher
*Attorney, Agent, or Firm*—Klein & Szekeres

[57] ABSTRACT

A valve for draining liquid from a pressurized gas system having a time-varying pressure comprises a housing defining an internal cavity communicating with (a) an inlet adapted to receive the time-varying pressure from the gas system, and (b) an outlet subject to ambient or subambient pressure. An inlet valve is movable in the housing between a first position that seals the inlet from the cavity and a second position that opens the inlet to the cavity in response to a predetermined pressure value. An outlet valve is movable in the housing between a first position that seals the outlet from the cavity and a second position that opens the cavity to the outlet. The inlet and outlet valves are biased so that the outlet valve is closed when the inlet valve is open, and the outlet valve is open for at least a substantial part of the time that the inlet valve is closed when the inlet pressure decreases below the predetermined value. In several embodiments, the inlet and outlet valves are separate valving elements that are movable axially relative to each other. In one embodiment, a single valving element has an upstream portion that serves as the inlet valve and a downstream portion that serves as the outlet valve, the outlet valving portion being open when the inlet valving portion is closed, and the outlet valving portion being closed when the inlet valving portion is open.

15 Claims, 6 Drawing Sheets

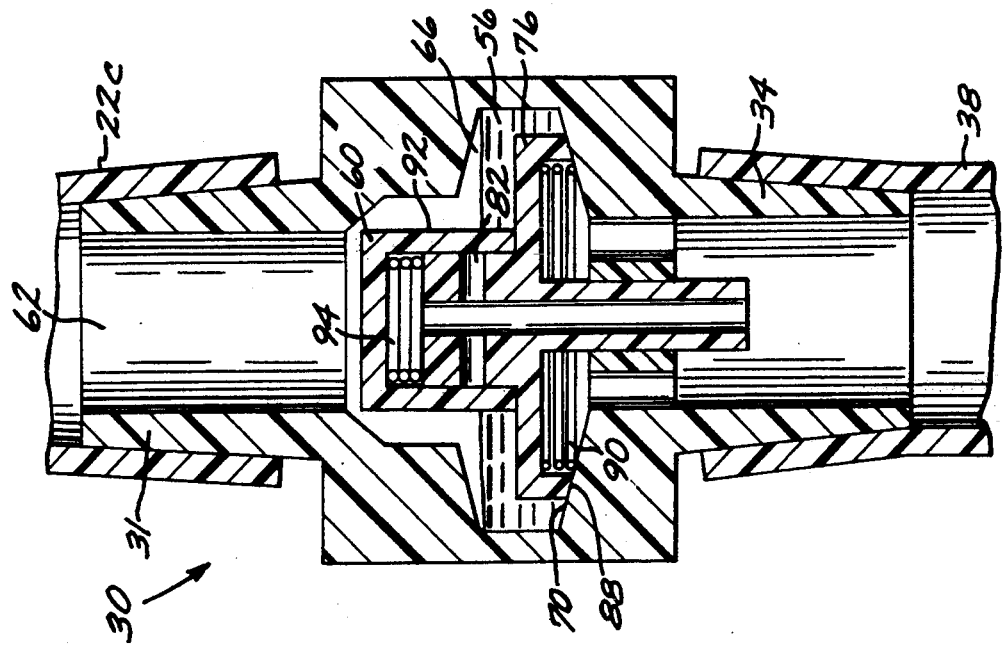
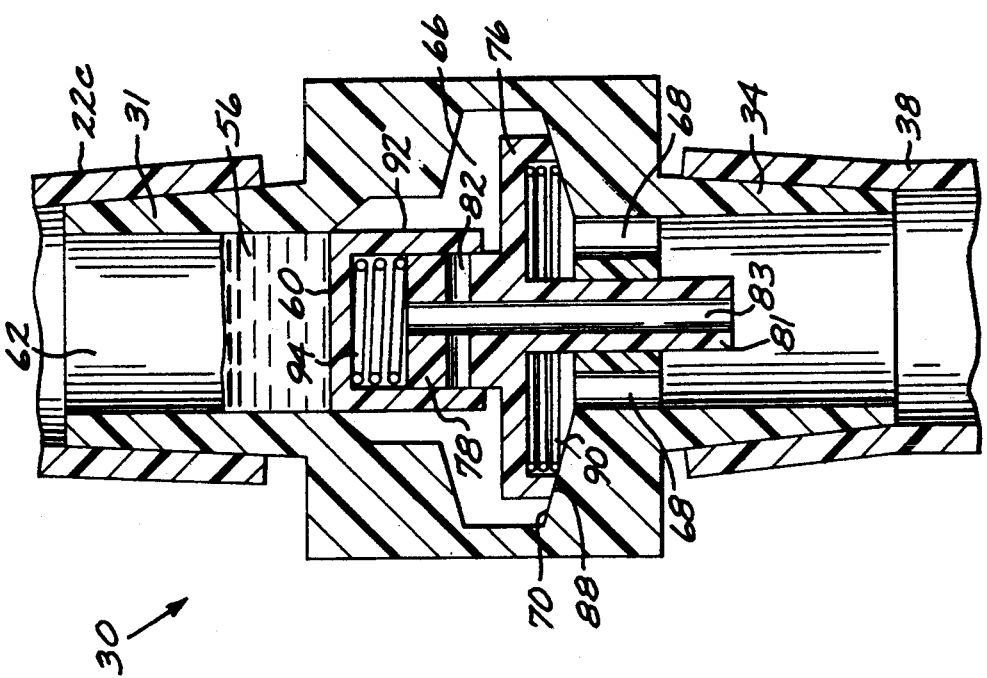

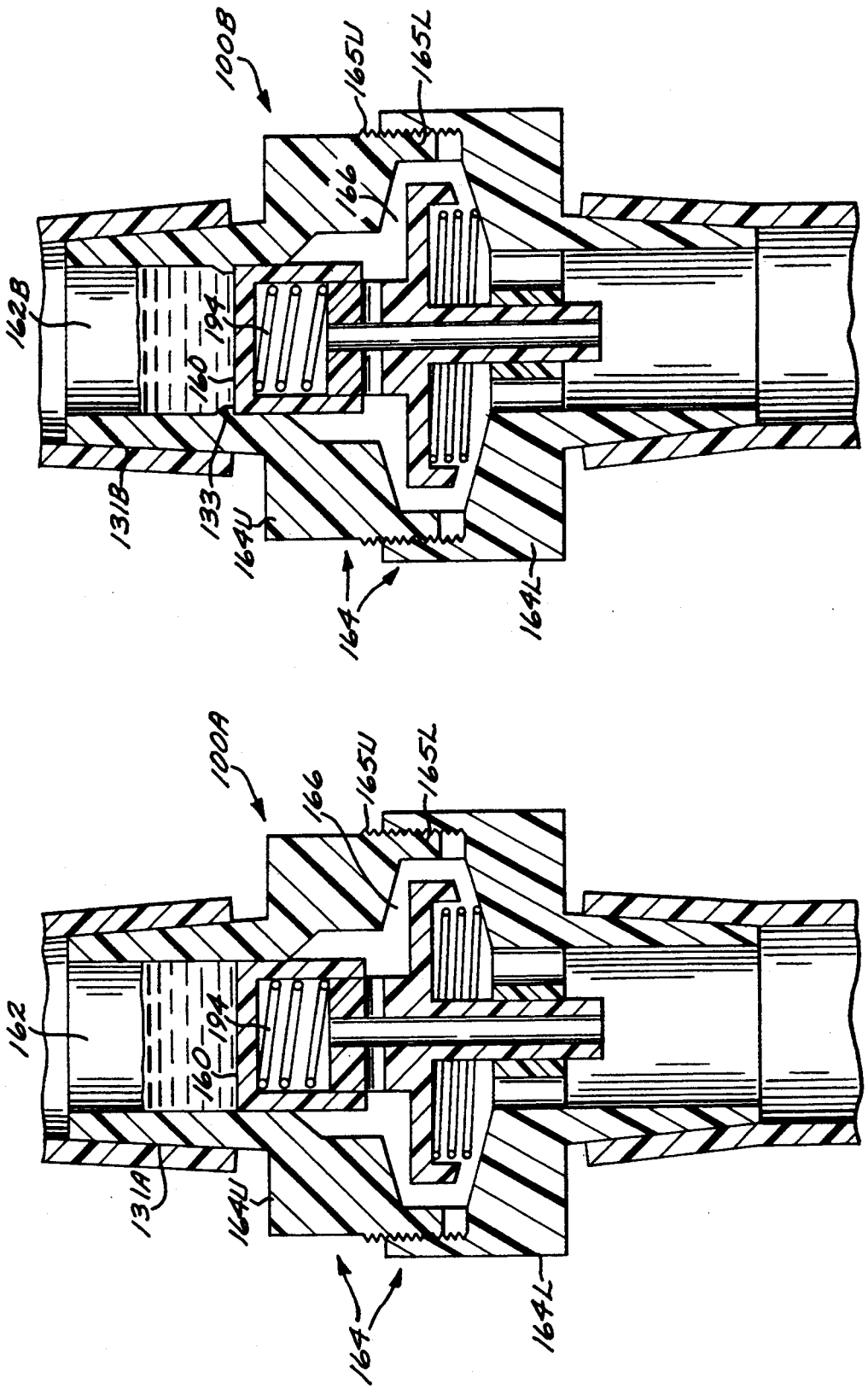

DRAIN VALVE FOR PRESSURIZED GAS SYSTEM

BACKGROUND OF THE INVENTION

The present invention relates generally to the field of liquid entrapment and draining devices, and more particularly to an apparatus for automatically removing liquid from a pressurized gas system such as one used in the pulmonary ventilation of human patients.

In a pressurized gas system, particularly where the gas is intentionally humidified, water or other liquid accumulates in the gas-carrying conduits of the system due to condensation or other effects. Such accumulations can have a deleterious effect on the functioning of the system. This is especially a problem in medical ventilator systems, which typically require the humidification (up to 100% relative humidity at body temperature) of the inspiratory gas, and which must accommodate high moisture content expiratory gas. In medical ventilator systems, excessive moisture accumulations can be counterproductive to the effective treatment of the patient, and it is therefore necessary to remove accumulated liquid from the patient circuit on a regular and frequent basis.

the most common approach to removing liquid accumulating in the patient circuit of a ventilator has been to disconnect the ventilator from the patient and then manually empty the liquid (typically saliva, sputum, and condensed water vapor from the humidifier), accumulated in the patient circuit conduits, into an open container. This may cause discomfort to the patient, and may expose the attendant or others to possibly infectious materials in the liquid. Furthermore, this procedure requires regular attention and a significant amount of labor.

Other approaches to the problems of condensate accumulation have included the metering of the amount of water introduced by the humidification system into the ventilator circuit by a servo-controlled water feed, and the insertion of heater wires into the patient circuit tubing to reduce the amount of condensation. These approaches have met with varied success. In any case, the servo-controlled water feed systems suffer from significantly increased cost and complexity, while the heater wires introduce flow resistance to a patient circuit, which is undesirable, especially in the small bore tubes used with neonatal patient circuits.

Drain valves or water traps such as those shown in U.S. Pat. No. 4,867,153 and 4,457,305 rely on complicated and/or unique liquid storage containers and introduce a significant volume into the patient circuit. This increase in patient circuit volume results in an increase in the system's pneumatic compliance, which is always undesirable, but particularly unacceptable in a patient circuit used for an infant.

While other drain valves have been developed for removing liquid from other forms of pressurized gas systems (see, e.g., U.S. Pat. No. 2,007,358, 2,100,485 and 2,125,144), they tend toward complex and expensive mechanisms, such as solenoid-actuated valves or tapered valve seats. In many instances, they may also significantly increase the volume in the pressurized gas circuit.

From cost, convenience, and anti-contamination standpoints, it would be desirable to have a drain valve that works automatically, and is inexpensive and disposable. Such a valve should also be adaptable for use with existing ventilator circuits, without significantly increasing either the volume of the circuit or its pneumatic resistance. Such a valve should also allow entrapment and drainage of the condensate without direct exposure to the atmosphere or to those attending the patient.

SUMMARY OF THE INVENTION

The present invention is a drain valve that can be conveniently connected to a lower portion of a pressurized gas system. In a ventilator patient circuit, this could be in either or both the inspiratory or expiratory portions of the circuit.

In the context of a medical ventilator, the approach contemplated by the subject invention is to allow the use of a simple humidifier which introduces copious humidification into the system, and then automatically remove the resultant condensation by means of the improved drain valve of the subject invention.

Broadly, a drain valve in accordance with the present invention comprises an inlet tube; a small volume interior cavity located below and connected to the inlet tube; drain port means connecting the cavity to an outlet tube; a vent passage connecting the interior of the cavity to the outlet tube; sealing means for providing fluid seals between (a) the outlet tube and the cavity, (b) the vent passage and the cavity, and (c) the inlet tube and the cavity; and biasing means for biasing the sealing means.

The drain valve uses the pressure cycle of the pressurized gas in the ventilator system automatically to drain liquid from the system. During a pressure cycle, liquid in a conduit of the system accumulates by gravity in the inlet tube of the valve. At a predetermined actuation value of the fluid pressure in the inlet tube, an outlet seal between the cavity and the outlet tube, and a vent seal between the cavity and the vent passage both close before an inlet seal between the inlet tube and the cavity opens. When the fluid pressure further increases past the predetermined actuation value, the inlet seal opens, allowing the liquids in the inlet tube to flow into the cavity. When the fluid pressure in the inlet tube cyclically decreases below the actuation value, the inlet seal closes. After this inlet seal is closed, the vent and outlet seals are opened to allow the liquid in the cavity to flow out the drain ports and/or the vent passageway to the outlet tube. This condition continues until again the inlet pressure cyclically increases to the predetermined actuation value, and the outlet and vent seals are again closed.

The outlet tube is connected by tubing to any kind of liquid collection bag or container, located below the drain valve, which is vented to ambient or sub-ambient pressure.

The drain valve of the subject invention allows for the automatic removal of liquids from a pressurized gas system without disconnecting the system, without exposing the liquids to the atmosphere or an operator, and without introducing significant pneumatic volume into the system. The drain valve can be manufactured simply and inexpensively for different fixed actuation values of the fluid pressures, or in an adjustable form, whereby the actuation value is selectively variable, for maximum flexibility. The valve can be manufactured using standard connectors, tubing, and containers, thereby requiring no special equipment or facilities to be fully operational.

Thus a primary object of the invention is to provide a novel drain valve for automatically removing liquid from a pressurized gas system using the normal pressure cycles of the system without having to disconnect the system. Further objects are to provide such a drain valve that adds little pneumatic volume to the gas system, and to provide such a valve that can be manufactured simply and inexpensively. Still another object is to provide such a liquid drain valve system having an adjustable actuation pressure value to meet the needs for different pressurized gas systems or applications.

BRIEF DESCRIPTION OF THE DRAWINGS

FIG. 3 is a view in vertical cross-section of the drain valve shown in FIG. 2 when the valve inlet pressure is at least equal to the predetermined actuation pressure value;

FIG. 4 is a view in vertical cross-section of the drain valve shown in FIGS. 2 and 3 when the valve inlet pressure is greater than the predetermined actuation pressure value;

FIG. 5A is a view in vertical cross-section of a drain valve in accordance with a second embodiment of the present invention, which includes means for the adjustment of the predetermined actuation pressure value;

FIG. 5B is a view in vertical cross-section of a darin valve in accordance with a modified form of the second embodiment shown in FIG. 5A, having adjustable means for compensating for the pressure level to be maintained at the lower pressure portion of the pressure cycle in a medical ventilator or the like;

DETAILED DESCRIPTION OF THE INVENTION

Figure 1:
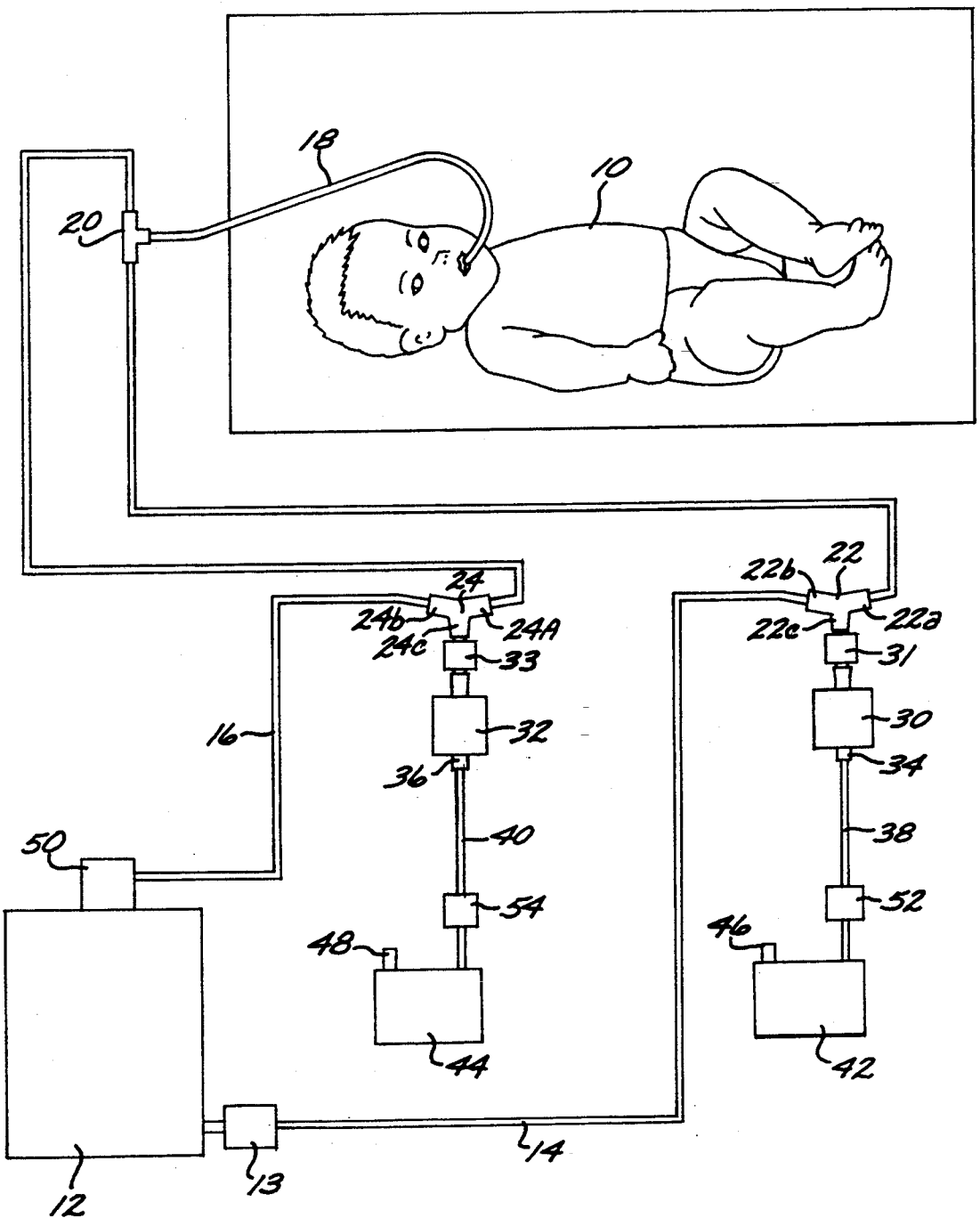
FIG. 1 is a diagram of an infant ventilator patient circuit utilizing drain valves in accordance with the present invention in both the inspiratory and expiratory legs of the circuit.

Referring now to the drawings, several preferred embodiments of the present invention are described in detail.

FIG. 1 shows a patient 10 (here, an infant) breathing with the assistance of a ventilator 12, which may be one of the constant-flow, time cycled type that is commonly used to ventilate infants and is well-known in the art. The ventilator 12 is connected to patient 10 by a patient circuit comprising an inspiratory line 14, an expiratory line 16, and a patient connection tube 18, all connected by a patient connector 20, of a type well known in the art, so as to form a pressurized gas system. A humidifier 13 is connected along the inspiratory line 14 adjacent the ventilator 12 to humidify gases coming from the ventilator 12 through the inspiratory line 14. Tees 22, 24 are connected at the low points along the length of each of the inspiratory and expiratory lines 14, 16, respectively, using two upper legs 22a, 22b and 24a, 24b of the tees 22, 24.

Identical drain valves 30, 32, in accordance with the subject invention, are connected to the tees 22, 24, respectively, via drain valve inlet tubes 31, 33 which have been inserted into the lowest legs 22c, 24c, respectively, of the tees 22, 24, and are held therein by a friction fit. The drain valves 30, 32 respectively have outlet ports 34, 36 at their lower ends which are connected, via drainage tubes 38, 40, respectively, to liquid storage containers 42, 44. The liquid storage containers 42, 44 may conveniently be disposable plastic bags that are commonly available in health care facilities. The containers 42, 44 are preferably vented to the atmosphere (i.e. ambient pressure) by vents 46, 48, respectively, which may incorporate conventional filters (not shown) for preventing the transmission of infectious or otherwise hazardous materials into the atmosphere.

While not shown in this figure, the drainage tubes 38, 40 from the two drain valves 30, 32 could be connected to another tee fitting and then to a single liquid storage container or to a vacuum system for sub-ambient pressure venting.

In the normal time-cycled ventilation mode, a stream of gas (typically air or oxygen-enriched air), to which water vapor may have been added by humidifier 13, is delivered under pressure from the ventilator 12 to the connector 20 via the inspiratory line 14. The patient 10 draws from this gas stream through the patient connection tube 18 during inhalation and returns exhaled gases to the connector 20 through the tube 18 during exhalation. The gas stream, periodically supplemented by the exhalation flow is returned from the connector 20 back to the ventilator 12 by the expiratory line 16. The expiratory line 16 terminates in an exhalation valve 50 that is automatically closed by the ventilator 12 to allow pressure to build up and gas to be forced into the lungs of patient 10 during inhalation, and then opened during exhalation.

Liquid vapors and droplets in the gas streams going through both the inspiratory and expiratory lines 14, 16 condense on the inside walls of the lines and flow by gravity to the tees 22, 24 and then to the drain valve inlet tubes 31, 33 during a lower pressure phase (below a predetermined actuation pressure value) of the ventilation cycle (i.e., during exhalation). As is explained in greater detail below with respect to FIGS. 2, 3 and 4, during a higher pressure phase (above the predetermined actuation pressure) of the ventilation cycle (i.e., during inhalation), the liquid which has accumulated in each of the inlet tubes 31, 33 enters and remains within each of the respective drain valves 30, 32. This increases the total pneumatic volume within the gas system only by the small volume within drain valves 30, 32.

During the next lower pressure phase of the ventilation cycle (exhalation), the inlet tubes 31, 33 are sealed from the interior of the valves 30, 32. Following the sealing of the inlet tubes, the outlet ports 34, 36 are opened, allowing the liquid within the valves 30, 32 to flow through the drainage tubes 38, 40 to the liquid containers 44, 46, while a subsequent volume of liquid from the lines 14, 16 accumulates within the inlet tubes 31, 33. This process repeats itself every full pressure cycle, thereby automatically removing all the liquids accumulating in the inspiratory and expiratory lines 14, 16.

If desired, fluid control valves 52, 54 can be provided in the drainage tubes 38, 40 to permit the liquid containers 42, 44 to be changed. When this is desired, the valves 52, 54 would be closed, allowing the liquid coming from the drain valves 30, 32 to accumulate for a short time inside the drainage tubes 38, 40 while the containers 42, 44 are removed and replaced.

While not shown in the drawings, a tee could be integrated into the inlet tube of a drain valve in accordance with the subject invention, allowing the insertion of such a drain valve in a pressurized gas line without the need for a separate connector tee.

The use of the drain valves 30, 32 permits liquid to be continuously removed from either or both inspiratory and expiratory lines of the patient circuit without any significant effects on the operation of the ventilation system, and requiring only the attention necessary for monitoring the level of liquid in the disposal containers and changing them when necessary. Further, since the liquid removal system utilizing the drain valve of the subject invention is a closed system, it minimizes the chance that any contamination in the removed liquids would be exposed directly to the atmosphere, or to the attendant or anyone else who might be in proximity to the ventilator system.

Another advantage of drain valves in accordance with the subject invention is that the only other items necessary to complete the liquid draining system are standard connectors, tubing, and liquid storage containers that are readily and inexpensively available at most health care facilities.

Figure 2:
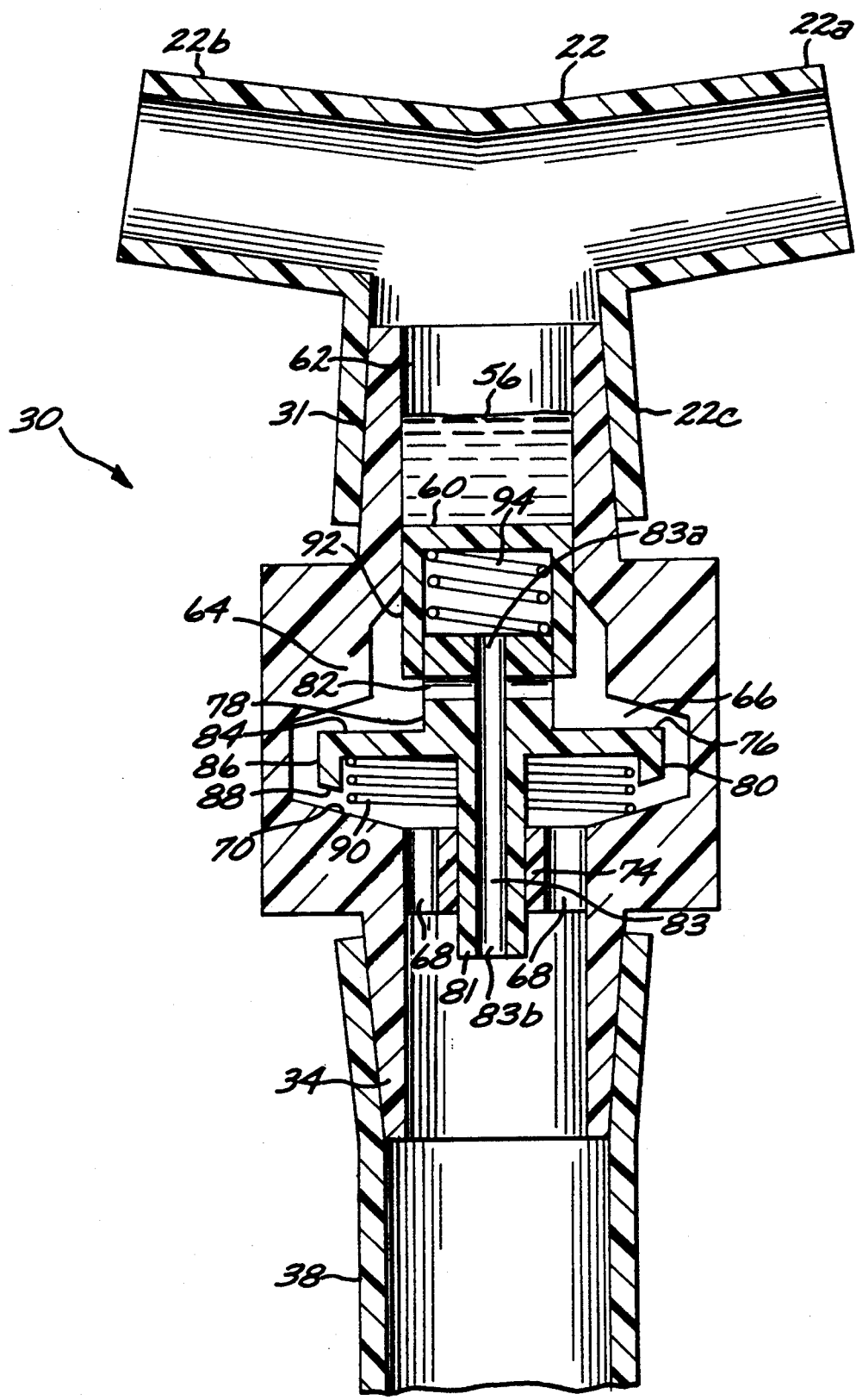
FIG. 2 is a view in vertical cross-section of a drain valve in accordance with a first embodiment of the present invention, showing the valve when the valve inlet pressure is less than a predetermined actuation pressure value.

FIG. 2 shows, in vertical cross-section, a more detailed view of the drain valve 30, during a lower pressure phase (below the predetermined actuation pressure value) of the pressurized gas cycle (i.e., during exhalation).

A volume of liquid 56, which has flowed by gravity from the inspiratory line 14 through the tee 22, has accumulated within the hollow inlet tube 31 of the valve 30. A piston-shaped inlet valving member 60 seals off the lower end of an inlet passage 62 formed within the inlet tube 31. The inlet valving member 60 is adapted to slide axially in and out of the inlet passage 62.

A hollow valve housing 64, connected to the inlet tube 31, defines a cavity 66 which communicates, at its upper or upstream end, with the inlet passage 62. At the lower or downstream end of the cavity 66, one or more outlet passages 68 are located to provide fluid communication between the lower end of the cavity 66 and the valve outlet port 34. The cavity 66 has a lower or downstream wall 70 that is preferable tapered toward the outlet passages 68 to facilitate the flow of liquid from the cavity 66 out through the passages 68 into the outlet port 34.

A generally annular outlet valving element 76 is located entirely within the cavity 66. The valving element 76 comprises a vent portion 78 and an outlet sealing portion 80. The vent portion 78 is cylindrical in shape, and is preferably integral with, and extends upstream from, the upstream side of the outlet sealing portion 80. Extending axially from the center of the downstream side of the sealing portion 80 is a vent tube 81. One or more vent apertures 82 extend radially through the vent portion 78 to the upstream end of an axial vent passage 83. The vent passage 83 is located coaxially with the vertical axis of the valve 30, extending from an upstream opening 83a in the upper end of the vent portion 78, then axially through the center of the vent tube 81 to a downstream opening 83b in the interior of outlet port 34. Thus, a fluid path is provided from the upstream portion of the cavity 66 to the outlet port 34, via the radial apertures 82 and the vent passage 83.

The outlet sealing portion 80 comprises a horizontal disk 84 with an annular lip 86 around its circumference, extending axially downstream from the disk 84. The annular lip 86 terminates in a sealing surface 88 adapted to seal against the lower wall 70 of the cavity 66 to effect a fluid-tight seal when the outlet valving element 76 is displaced downwardly (i.e., in downstream direction). An outlet closure spring 90 is located between the lower wall 70 and the downstream-facing side of the disk 84 to bias the outlet valving element 76 upwardly (i.e., in an upstream direction), thereby providing a normally open valve condition, in which a fluid path is provided between the sealing surface 88 and the lower cavity wall 70.

The inlet valving member 60 is in the shape of a hollow piston having a cylindrical side portion 92 with an inside diameter that is slightly larger than the outside diameter of the outlet valving element vent portion 78. The vent portion 78 thus is movably axially within the interior of the inlet valving member 60. An inlet closure spring 94 is located between the closed upstream end of the inlet valving member 60 and the upper (upstream) surface of the vent portion 78 (which includes the upstream opening 83a of the vent passage 83), thereby biasing the outlet valving element 76 downwardly (toward the downstream direction) away from the inlet valving member 60. The space enclosed between the inlet valving member 60 and the vent portion 78 is always vented to the outlet tube 34 via the vent passage 83.

The cylindrical side portion 92 of the inlet valving member 60 is configured such that whenever the upper surface of the inlet valving member 60 is moved axially out of the inlet passage 62 to open the inlet passage 62 to the cavity 66, the inner surface of the cylindrical side portion 92 seals off the vent apertures 82 from the cavity 66, thereby closing the venting path between the cavity 66 and the outlet port 34.

The spring constant of the inlet closure spring 94 is greater than that of the outlet closure spring 90. As the inlet pressure increases up to a predetermined actuating pressure value, but before the inlet valving member 60 has reached its downstream limit of travel, the outlet valving element 76 will be urged downwardly (in a downstream direction) to effect a sealing contact (the "outlet seal") between the sealing surface 88 of the outlet sealing portion 80 and the lower wall 70 of the cavity 66. The outlet seal, which closes the outlet passages 68 from the cavity 66, is thus established before the actuation pressure value is reached, and before the "inlet seal" established between the cylindrical side portion 92 of the inlet valving member 60 and the interior wall surface of the inlet tube 31, is opened by the withdrawal of the inlet valving member 60 from the inlet passage 62. When the actuation pressure value is attained in the inlet passage 62, the inlet valving member 60 is moved axially out of the inlet passage 62, against the force of the inlet closure spring 94, thereby opening the inlet passage 62 to the cavity 66. Such an unsealing (i.e. release) of the inlet seal occurs just after the increasing gas pressure in the inlet passage 62 has reached the predetermined actuating pressure value.

The predetermined actuation pressure value must be greater than the maximum pressure during the lower pressure phase (exhalation) of the pressure cycling and less than the maximum pressure during the higher pressure phase (inhalation). Preferably, the predetermined actuation pressure value would be reached, and hence drain valve actuation would occur, at the very beginning of the higher pressure phase (inhalation) and would end at the end of such higher pressure phase, so that the drain valve would be in each of its two operating modes during a significant portion of each pressure cycle.

For different categories of patients and ventilator systems, drain valves having spring constants set for different predetermined actuation pressure values may have to be used.

The operation of the drain valve 30 can best be explained with reference to FIGS. 2, 3, and 4, which show the valve during three different points in a pressure cycle in the pressurized gas system.

FIG. 2 shows the valve 30 when the pressure in the system is substantially below the predetermined actuation pressure value, as would be the case (in the context of a medical ventilator system) during exhalation. The volume of liquid 56, received from the inspiratory line 14, accumulates in the inlet passage 62. The inlet valving member 60 is at its upstream limit of travel, sealing off the lower end of the inlet passage 62, and thereby preventing any liquid from flowing into the cavity 66. In other words, the inlet seal, as described above, is closed. The gas pressure in the inlet passage 62 is not sufficient to overcome the bias of the inlet closure spring 94, so that the cylindrical side portion 92 of the inlet valving member 60 remains above and does not seal off the vent apertures 82. This permits the cavity 66 to be vented to the outlet port 34 via the vent passage 83. Additionally, since the gas pressure in the inlet passage 62 is substantially below the actuation pressure value, the force of the outlet closure spring 90 upwardly biases the outlet valving element 76, including the outlet sealing portion 80, away from the lower cavity wall 70, thereby releasing the outlet seal and opening the fluid path between the cavity 66 and the outlet passages 68. With the cavity 66 vented to the outlet port pressure by means of the vent passage 83 and the vent apertures 82, any fluids in the cavity 66 will flow out through outlet passages 68, to the outlet port 34, into the drainage tube 38, and eventually into the liquid container 42.

FIG. 3 shows the valve 30 when the pressure in the inlet passage 62, acting on the inlet valving member 60, has approached, but not yet exceeded, the predetermined actuation pressure value, thereby initiating the travel of the inlet valving member 60 from its upstream limit of travel toward its downstream limit of travel, against the biasing force of the inlet closure spring 94. Normally, in a medical ventilation system, this would be at the beginning of inhalation. The pressure in the inlet passage 62 has not yet, however, reached a value sufficient to cause the inlet valving member 60 to reach its downstream limit of travel, in which position the inlet passage 62 would be open to the cavity 66, as described below. (The total inlet pressure acting on the inlet valving member 60 would be the sum of the gas pressure in the inspiratory line 14, plus the pressure due to the weight of the liquid 56 accumulated in the inlet passage 62.)

The travel of the inlet valving member 60 compresses the inlet closure spring 94. The compression of the inlet closure spring 94, in turn, exerts a downward force against the upper surface of the vent portion 78 of the outlet valving element 76, so as to overcome the bias of the outlet closure spring 90. As a result, the outlet valving element 76 is forced downwardly against the force of the outlet closure spring 90, causing the sealing surface 88 of the outlet valving element 76 to seal against the lower wall 70 of the cavity 66. Thus, the outlet seal, as described above, is closed, thereby blocking the flow of liquid from the cavity 66 out the outlet passages 68. Substantially simultaneously, the cylindrical side portion 92 of the inlet valving member 60 closes the vent apertures 82, thereby completely sealing the cavity 66 from the outlet tube 34.

FIG. 4 shows the valve 30 when the pressure within the inlet passage 62 has exceeded the predetermined actuation pressure value. In a medical ventilation system, this would be during most of inhalation. The inlet pressure in the inlet passage 62 has caused the inlet valving member 60 to move even further down (in a downstream direction), releasing the inlet seal between the inlet passage 62 and the cavity 66, thereby allowing the liquid 56 to flow into the cavity 66. As the outlet valving element 76 has been moved to its lowest position so as to seal off the cavity 66 from the outlet passages 68, and since the vent apertures 82 have been sealed off from the cavity 66 by the cylindrical side portion 92 of the inlet valving member 60, the liquid 56 is trapped in the cavity 66. Under this condition, the only pneumatic volume that has been added to the pressurized gas system is the small internal volume of the cavity 66 above (upstream from) the outlet seal; that is, between the outlet valving element 76 and the upper (upstream) end of the cavity 66.

As the pressure in the system starts diminishing at the end of inhalation, the force on the inlet valving member 60 lessens, allowing the inlet closure spring 94 to expand, and the inlet valving member 60 to move upward. The outlet valving member 76 remains seated as a result of the residual pressure in the cavity 66 attained during the pressure cycle acting across that part of the annular area of the outlet valving member 76 defined by the difference between the cross-sectional area of the inlet valving member 60 and that of the outlet valving member 76. The parts are configured such that the cavity 66 remains sealed from the outlet passages 68 and the vent apertures 82 until after the inlet seal is effected between the inlet tube 31 and the cavity 66 by the inlet valving member 60. As the inlet pressure further decreases, the inlet valving member 60 moves further upward, and the seal between the cavity 66 and the vent apertures 82 is released, thereby relieving the residual pressure within cavity 66 through the vent apertures 82 and the axial vent passage 83. The relief of the residual cavity pressure permits the outlet valving member 76 to move upwardly due to the upward bias of the outlet closure spring 90. When this occurs, the liquid 56 within the cavity 66 drains out into the outlet port 34 through the outlet passages 68.

In this way, the liquid 56 from within the pressurized gas system is permitted to accumulate within the inlet passage 62 of the inlet tube 31 during the lower pressure phase (exhalation) of a pressure cycle, as shown in FIG. 2. When the pressure at the inlet passage 62 exceeds the predetermined actuation pressure value during inhalation, the accumulated liquid 56 is permitted to flow into and be sealed inside the cavity 66, as shown in FIG. 4. When the pressure in the system diminishes below the predetermined actuation pressure value, the inlet passage 62 is first sealed from the cavity 66, thereby allowing more liquid to accumulate in the inlet passage 62. Immediately after the inlet passage 62 is sealed as the inlet pressure decreases, the cavity 66 is vented and opened to the outlet port 34, allowing the liquid 56 to flow out of the cavity 66 to the outlet port 34, then through the drainage tubing 38 to the liquid container 42. Therefore, liquid will be drained from the system during every pressure cycle where the pressure exceeds the predetermined actuation pressure value.

The predetermined actuation pressure value at which a drain valve 30 in accordance with the subject invention will be actuated may be modified by changing the spring constants of the inlet closure spring 94 and the outlet closure spring 90, by changing the area of the upper surface of the inlet valving member 60, and/or by changing the position at which the inlet valving member 60 effects its seal between the inlet passage 62 and the cavity 66. All of these parameters or dimensions can be preset at the time of manufacture.

FIG. 5A shows an alternate embodiment of a drain valve which permits some adjustment of this predetermined actuating pressure value in a single unit. FIG. 5A shows a drain valve 100A during the same pressure condition depicted in FIG. 2, i.e. inlet pressure less than the predetermined actuation pressure value.

The drain valve 100A is very similar to the valve 30 shown in FIGS. 2, 3 and 4, except that the position where the inlet tube 131A meets the cavity 166 is movable relative to the inlet valving member 160. This is accomplished by having a housing 164 for the the valve 100A formed of upper and lower housing members 164U, 164L having mating circumferential threaded surfaces 165U, 165L, respectively. As the upper and lower housing members 164U, 164L are unscrewed relative to one another, the distance diminishes between the upper surface of the inlet valving member 160 and the transition point where the inlet tube 131A meets the cavity 166. As this distance decreases, the inlet seal between the inlet passage in the inlet tube 131A and the cavity 166 will be released at a relatively lower pressure. At the same time, the volume in the cavity 166 will be increased as members 164U, 164L are unscrewed.

Correspondingly, if the housing members 164U, 164L are screwed further into one another, the pressure at which the inlet seal will be released, i.e. the predetermined actuating pressure value of the valve 100A, will be increased, and the volume within the cavity 166 will be decreased. Therefore, this adjustable embodiment of drain valve allows a user to adjust the predetermined actuating pressure value and volume of liquid removed from the pressure system during each pressure cycle.

It is important that the threaded engagement between the upper and lower housing members 164U, 164L be fluid tight. Nevertheless, it is not critical which piece has the inner or outer threads. Further, it is contemplated that in lieu of a threaded engagement arrangement between the housing members, a threaded engagement might be located at or near the location where the inlet tube meets the housing.

FIG. 5B shows another embodiment of the adjustable drain valve 100B which is very similar to the adjustable drain valve 100A. The drain valve 100B uses the same parts as the valve 100A except that its inlet tube 131B includes one or more stops 133 in the inlet passage 162B which limit the upward vertical travel of the inlet valving member 160 and therefore allow the inlet closure spring 194 to be preloaded. This configuration allows the dimensions and characteristics of the parts to be determined based on the difference between the anticipated pressure at the higher portion of the pressure cycle and the desired actuation pressure value while compensating for an adjustment in the pressure at the lower portion of the pressure cycle. For example, in the treatment of neonates, it is often desirable to maintain a positive end expiratory pressure ("PEEP") throughout the exhalation portion of the ventilation cycle. The amount of PEEP involved may vary depending on the patient and the circumstances. This embodiment would permit a user to adjust the drain valve 100B based on the PEEP set on the ventilator so as to assure that the valve will be actuated as desired during the pressure cycle. Without being able to preload the inlet closure spring 194 to compensate for PEEP, excessive travel of the inlet valving member 160 up the inlet passage 162B would have to be permitted.

Figure 6:
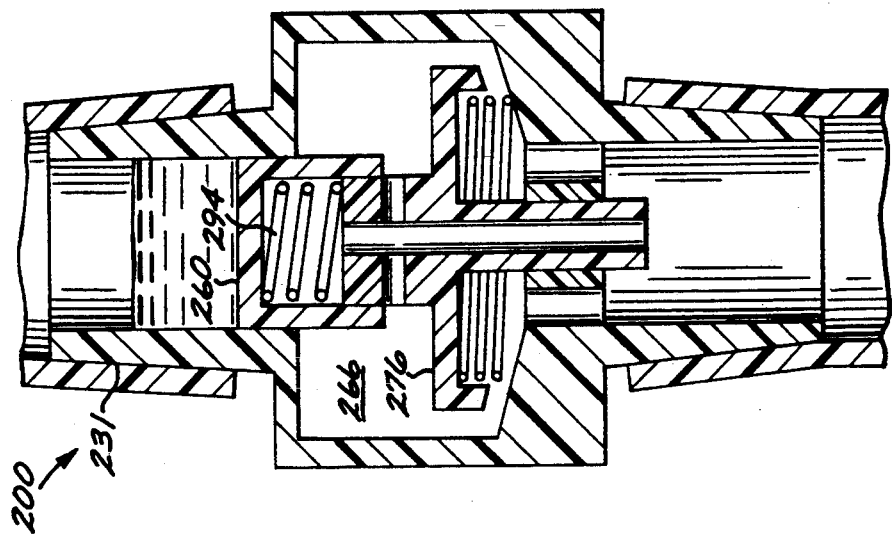
FIG. 6 is a view in vertical cross-section of a drain valve in accordance with a third embodiment of the present invention, having an enhanced drainage volume capacity.

FIG. 6 shows another embodiment of the drain valve 200 in accordance with the subject invention. The drain valve 200 is essentially the same as the drain valve 30 shown in FIG. 2, except that it has a cavity 266 with a larger volume, allowing it to remove a greater volume of liquid during each pressure cycle, since the maximum amount of liquid that can be removed is equal to the volume within the valve cavity above the outlet seal. This is accomplished by the use of a housing 264 with a thinner wall, so that the volume within cavity 266 is larger than that of the cavity 66 of the valve 30. This embodiment of the drain valve would be more suitable for use in a ventilation system for an adult, or in another type of pressurized gas system where the system is not sensitive to the cavity volume, by opening up the system to the valve cavity during the higher pressure part of each pressure cycle.

Figure 7:
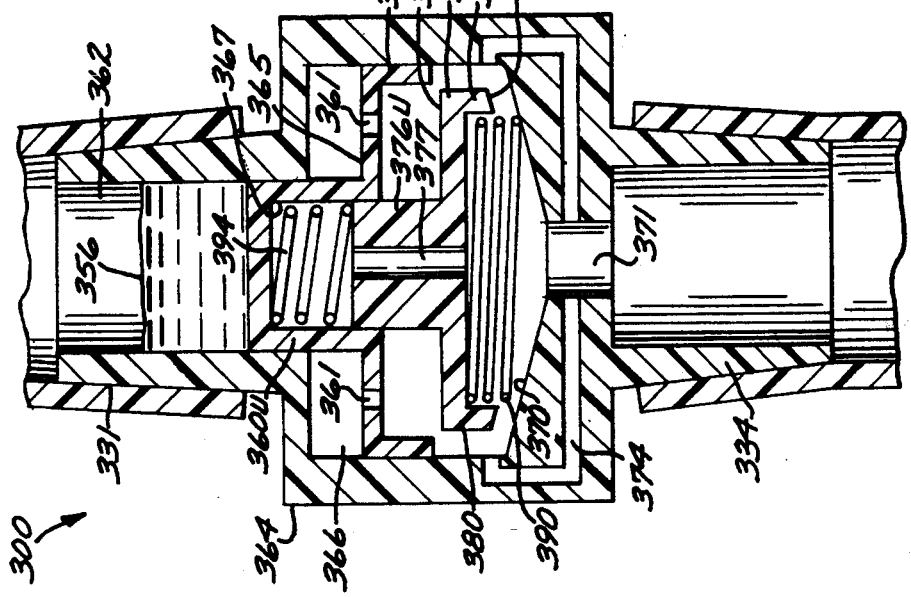
FIG. 7 is a view in vertical cross-section of a drain valve in accordance with a fourth embodiment of the present invention, having peripheral vent passageways rather than a coaxial vent passageway.

In FIG. 7, another embodiment of the drain valve 300 is shown in vertical cross-section during the same inlet pressure conditions as that depicted in FIG. 2, i.e. pressure lower than the predetermined actuation pressure value. This embodiment utilizes a peripheral venting design rather than the coaxial design shown in FIGS. 2-6.

The drain valve 300 has an inlet tube 331, an outlet port 334, and a housing 364 between and connected to them. The basic fluid flow path through the valve 300 is from the inlet tube 331 to an interior cavity 366 within housing 364 and then through the outlet tube 334.

During the lower pressure phase of a pressure cycle (when the pressure is less than the predetermined actuation pressure value), a volume of liquid 356 from the pressurized gas system accumulates in an inlet passage 362 within the inlet tube 331. The inlet tube 331 is sealed from the cavity 366 by an upper piston-like portion 360U of an inlet valving member 360.

Formed within the housing 364 are vent passages 374 which provide a fluid connection between the cavity 366 and the outlet port 334. While two vent passages 374 are shown, one or more than two may also be used. The outer surface of a lower cylindrical vent sealing portion 360L of the inlet valving member 360 is adapted to slide over the entrances to the vent passages 374 so as to act as a vent seal when the upper portion 360U of the inlet valving member slides downwardly. This same surface of the vent sealing portion 360L acts as a guide to keep the upper portion 360U of the inlet valving member in proper alignment with respect to the inlet passage 362. A plurality of apertures 361 are located within a horizontal annular portion 365 of the inlet valving member where the upper and lower portion 360U, 360L join. The apertures 361 allow fluid to freely flow through the horizontal portion 365 of the inlet valving member within the cavity 366.

The inner, cylindrical surface of the upper portion 360U defines a bore 367 that receives an upper cylindrical portion 376U of the outlet valving member 376. An inlet closure spring 394 is located in the bore 367 between the inlet valving member upper portion 360U and the outlet valving member upper portion 376U, biasing the two portions away from each other. A hole 377 through the outlet valving member upper portion 376U allows fluid connection at all times between the bore 367 and the outlet port 334.

The outlet valving member 376 also includes a lower, outlet sealing portion 380. The outlet sealing portion 380 comprises a horizontal disk 384 with a downwardly-depending annular lip 386 around its circumference, and a sealing surface 388 on the lower end of the lip 386. The sealing surface 388 mates with a sloping lower wall 370 of the cavity 366 when the cavity 366 is to be sealed from the outlet port 334. A cavity outlet 371 is located at the lowest portion of the cavity 366 to connect it to the outlet port 334 and allow any liquid in the cavity 366 to drain out when the outlet sealing portion 380 is not sealing the outlet port 334. An outlet closure spring 390 is positioned between the outlet sealing portion 380 and the lower cavity wall 370, biasing the outlet sealing portion 380 toward the open, upward position.

The operation of the drain valve 300 is very similar to that of the drain valve 30. When the pressure within inlet passage 362 is below the predetermined actuation pressure value, as shown in FIG. 7, the inlet valving member 360 seals the inlet passage 362 from the cavity 366, allowing liquid 356 coming from a line in the gas system to accumulate in inlet passage 362. When the inlet pressure in the inlet passage 362 increases up to the predetermined actuation pressure value, the inlet valving member 360, while continuing to seal the inlet passage 362 from the cavity 366, is pushed downwardly. This causes (a) the inlet closure spring 394 to push the outlet valving member 376 downwardly, until the outlet port 334 is sealed; and (b) the vent sealing portion 360L to seal the cavity 366 from the vent passages 374.

As the inlet pressure in the inlet passage 362 increases above the predetermined actuation pressure value, the inlet valving member is pushed below the juncture between the inlet passage 362 and the cavity 366, thereby unsealing the inlet passage 362, and allowing the liquid 356 to flow into the cavity 366. Since the cavity 366 is sealed from the outlet port 334 and the vent passages 374, the liquid 356 remains in the cavity 366.

As the pressure cycle progresses, the inlet pressure in the inlet passage 362 decreases to below the predetermined actuation pressure value. This causes the inlet valving member 360 to move upwardly, first sealing the inlet passage 362 from the cavity 366, then unsealing the vent passages 374. When the vent passages 374 are unsealed, the cavity 366 is vented to the outlet port 334 (which is at a pressure at or below ambient), thereby relieving the pressure within the cavity 366. Because the pressure in the cavity 366 has been relieved, and the force exerted by the inlet closure spring 394 has been diminished by the upward movement of the inlet valving member 360, the outlet valving member 376 moves upwardly. This relieves the outlet seal from the bottom of the cavity 366, allowing the liquid remaining in the cavity 366 to drain through the outlet port 334.

Preferably, the inlet tube 331, the casing 364, and the outlet port 334 are integral to one another and made from molded plastic. Two identical mating parts may be molded, each with one half the vent passages 374, cavity 366, inlet tube 331 and outlet port 334. These are joined together by glue or other suitable fastening means to ensure a fluid tight seal between the mating parts.

Figure 8:
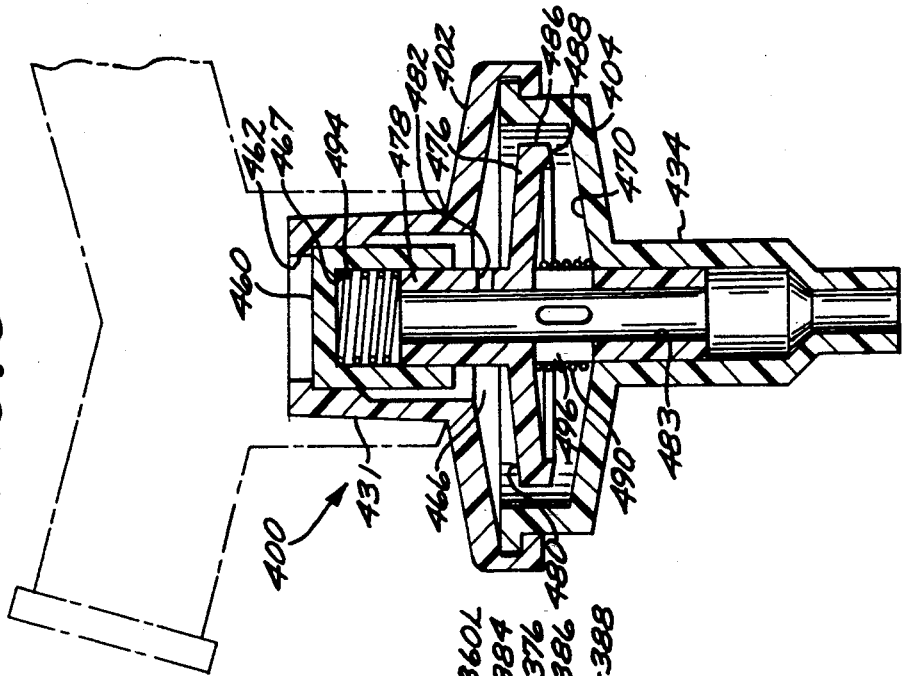
FIG. 8 is a view in vertical cross-section of a drain valve in accordance with a fifth embodiment of the present invention, in which the liquid drainage path has been modified.

Still another embodiment of the drain valve 400 is shown in vertical cross-section in FIG. 8. The pressure condition depicted is a lower pressure phase of the pressure cycle, with the pressure less than the predetermined actuation pressure value. The drain valve 400 comprises an upper housing portion 402 that is attached to a lower housing portion 404, defining an internal cavity 466 between them. The cavity 466 is of an appreciably smaller volume than the corresponding cavities of the previously described embodiments, making this embodiment particularly advantageous for use with pediatric or neonatal ventilators, or in other applications where the added pneumatic volume is sought to be minimized.

The upper housing portion 402 includes an inlet tube 431 that defines an internal inlet passage 462. The lower housing portion 404 includes an outlet tube 434. In the low pressure condition shown in FIG. 8, the inlet passage 462 is closed by an inlet valving member 460, which is biased toward the closed position by an inlet closure spring 494. The inlet closure spring 494 is seated in a bore 467 within the hollow interior of the inlet valving member 460, between a surface on the underside of the top of the inlet valving member 460, and an annular surface defined at the upstream end of a cylindrical venting portion 478 of an outlet valving member 476.

The venting portion 478 of the outlet valving member 476 is provided with one or more radial venting apertures 482 that communicate between the cavity 466 and an axial passage 483 extending through the entire axial length of the outlet valving member 476. The venting portion 478 is connected to a generally annular sealing portion 480, having a downwardly depending peripheral lip 486, terminating in a sealing surface 488. Extending downstream from the downstream side of the sealing portion 480 is a cylindrical outlet portion 489 that fits inside the outlet tube 434 for sliding movement therein. An outlet closure spring 490 is seated between the downstream surface of the sealing portion 480 and a downstream wall 470 in the interior of the cavity 466. The outlet closure spring 490 coaxially surrounds a cylindrical intermediate portion of the outlet closure member 476 which includes a plurality of radial drainage apertures 496 that communicate between the cavity 466 and the axial passage 483.

The operation of the drain valve 400 is essentially the same as that of the previously described embodiments.

With the inlet valving member 460 biased toward its first (closed) position by the inlet closure spring 494, a volume of liquid collects in the inlet passage 462. The ambient (or subambient) pressure from the outlet port 434 is communicated to both the upstream side and the downstream side of the sealing portion 480 of the outlet valving member 476 through the axial passage 483, the drainage apertures 496, and the venting apertures 492, thereby equalizing the pnuematic pressure on both sides of the sealing portion 480. As the pressure in the inlet passage 462 increases, the inlet valving member 460 is urged downwardly against the inlet closure spring 494, which, in turn, urges the outlet valving member 476 downwardly, against the force of the outlet closure spring 490, until the sealing surface 488 seals against the downstream cavity wall 470, closing the outlet port.

When the pressure in the inlet passage 462 exceeds a predetermined actuation pressure value, the inlet valving member 460 is moved downwardly to its second (open) position, opening the inlet passage 462 to the cavity 466, and allowing the liquid to flow into the cavity 466. At this point in the cycle, the inlet valving member 460 has moved axially with respect to the venting portion 478 of the outlet valving member 476, so as to close off the venting apertures 482, as previously described.

As the pressure in the inlet passage cyclically decreases below the actuation pressure value, the inlet valving member 460 returns to its first (closed) position, sealing the inlet passage 460 from the cavity 466. The outlet valving member 476 returns to its open position, allowing the liquid to drain from the cavity 466 through the drain apertures 496, the axial passage 483, and the outlet port 434.

In the embodiment of FIG. 8, the use of the axial passage 483 both for venting the upstream side of the sealing portion 480 (through the venting apertures 482), and for draining the cavity 466 (through the drainage apertures 496) allows for smaller overall dimensions than the previously-described embodiments, thereby allowing the cavity 466 to be made with a relatively small internal volume, for the purposes described above.

Figure 9:
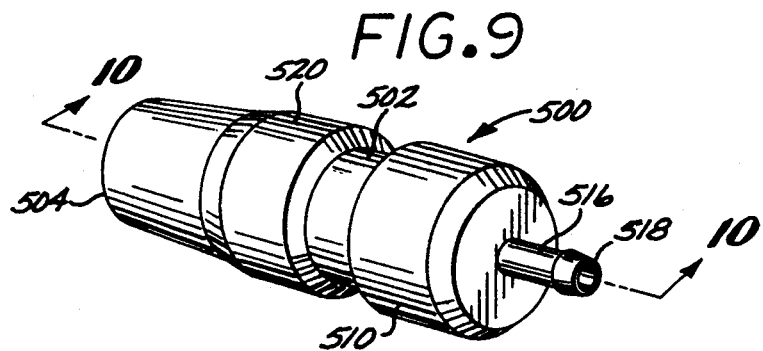
FIG. 9 is a perspective view of a drain valve in accordance with a sixth embodiment of the present invention, which employs only a single biasing spring.
Figure 10:
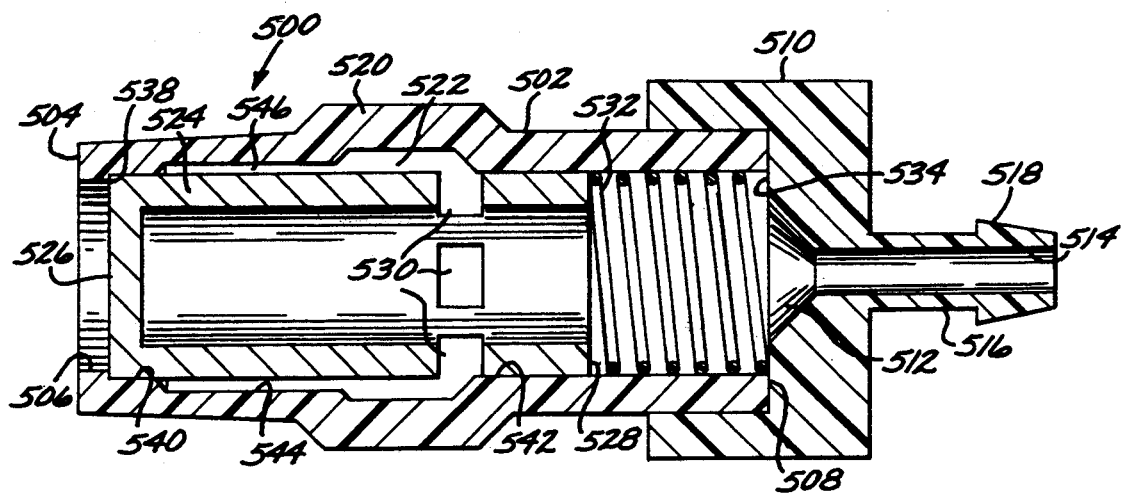
FIG. 10 is a cross-sectional view taken along line 10 - 10 of FIG. 9, showing the valve when the valve inlet pressure is less than the predetermined actuation pressure value.
Figure 11:
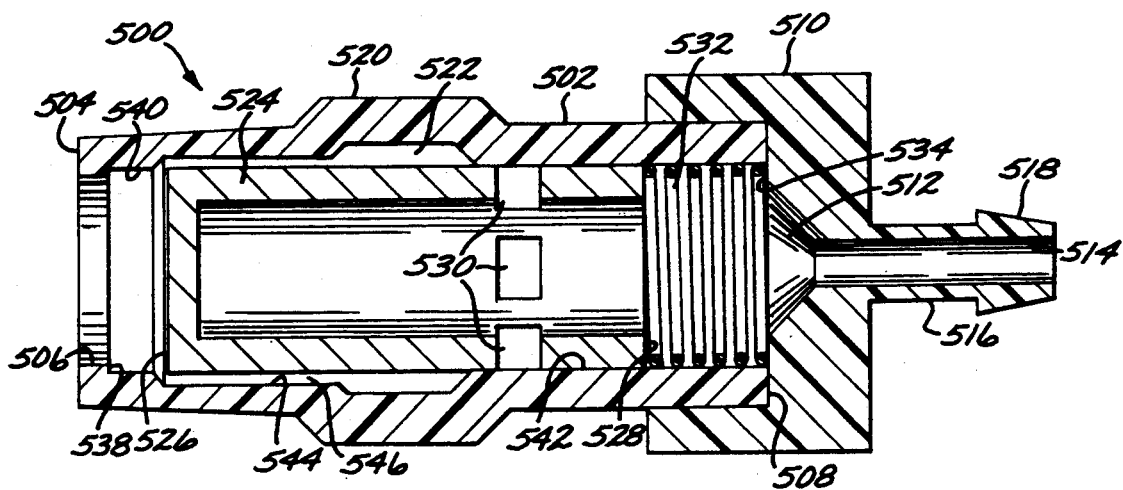
FIG. 11 is a cross-sectional view, similar to that of FIG. 10, but showing the valve when the valve inlet pressure is at least equal to the actuation pressure value.

FIGS. 9, 10, and 11 illustrate still another embodiment of the present invention. A drain valve 500, in accordance with this embodiment of the invention, comprises a hollow, generally tubular housing 502 having an upstream end 504 defining an inlet passage 506, and an open downstream end 508 to which is attached an outlet fitting 510. The outlet fitting includes a generally funnel-shaped internal drainage passage 512 that communicates between the open downstream end 508 of the housing 502 and an outlet passage 514 within a tubular outlet port 516. The outlet port 516 has a barbed end 518 for attachment to a drain tube, as shown in FIG. 1. The housing 502 includes an enlarged-diameter mid-portion 520 that defines an internal cavity 522.

A valving element 524 is disposed within the housing 502 for sliding movement between first and second axial positions, shown in FIGS. 10 and 11, respectively. The valving element 524 is shaped somewhat like a piston, with a closed upstream end 526 and an annular downstream end 528 that defines a downstream opening from the hollow interior of the valving element 524. A plurality of apertures 530 are disposed around the periphery of the valving element 524, closer to the downstream end 528 than to the upstream end 526. A coil valve spring 532 is seated between the downstream end 528 of the valving element 524 and an annular seating surface 534 surrounding the entrance of the drainage passage 512 in the outlet fitting 510. The valve spring 532 biases the valving element 524 toward the first, or closed, position (FIG. 10), in which the upstream end 526 of the valving element 524 seals against an annular valve seat 538 at the upstream end of the cavity 522. In the second, or open position (FIG. 11), the upstream end 526 of the valving element 524 is axially displaced, in the downstream direction, from the valve seat 538.

The housing is internally configured with a reduced inside diameter upstream portion 540 adjacent the valve seat 538, and a similarly reduced internal diameter downstream portion 542. The inside diameters of the reduced diameter upstream portion 540 and downstream portion 542 are just slightly larger than the outside diameter of the valving element 524, providing sliding bearing surfaces for the valving element 524. Between the upstream portion 540 and the cavity 522 is a slightly enlarged inside diameter intermediate portion 544 that provides an annular clearance 546 between the inner surface of the intermediate portion 544 and the outer surface of the valving element 524. The annular clearance 546 communicates with the cavity 522.

The drain valve 500 operates as follows: A volume of liquid accumulates in the inlet passage 506 while the cyclical pressure in the pressurized gas system increases. During this phase, the valving element 524 is in the first (closed) position of FIG. 10, in which its upstream end 526 is sealingly seated against the valve seat 538. In the first position, the apertures 530 are in communication with the cavity 522.

When the pressure in the inlet passage 506 exceeds a predetermined actuation pressure value, the valving element 524 is moved axially, against the force of the valve spring 532, to its second (open) position, shown in FIG. 11. In this second position, the upstream end 526 of the valving element 524 is disspaced from the valve seat 538 by a distance at least equal to the axial length of the reduced diameter upstream housing position 540, thereby opening the inlet passage 506 to allow the liquid to flow from the inlet passage 506 into the cavity 522. The axial movement of the valving element 524 from the first position to the second position also moves the apertures 530 out of communication with the cavity 522, so as to be closed by the internal wall surface of the reduced diameter downstream portion 542 of the housing 502. In this manner, the valving element 524 acts as an outlet valve, closing the outlet flow path from the cavity 522 to the drainage passage 512 when the valving element 524 is in its second position.

As the pressure at the inlet passage 506 cyclically decreases below the actuation pressure value, the valve spring 532 urges the valving element 524 to move axially back toward its first position. This movement brings the apertures 530 back into communication with the cavity 522 to open the outlet flow path, allowing the liquid to drain from the cavity 522 into the apertures 530, and then through the open downstream end 508 of the valving element 524, the drainage passages 512, and the outlet passage 514. As the valving element 524 reaches its first position, seated against the valve seat 538, it is ready for the next increasing pressure phase of the pressure cycle, as described above.

The embodiment of FIGS. 9–11 offers a number of advantages. First, as compared to the previously described embodiments, it comprises fewer components, employing only a single valving element and a single valve spring for controlling both the inlet and the outlet of the valve. Thus, it is simpler and more economical to manufacture than are the previously described embodiments. The two valve element bearing surfaces (provided by the upstream portion 540 and the downstream portion 542 of the housing 502) yield a very smoothly operating valve. The compact dimensions of this embodiment, and particularly the small pneumatic volume of the cavity 522, make it particularly well-suited for applications, such as neonatal ventilators, in which the pneumatic volume added by the valve should be kept to a minimum. If a larger liquid capacity is desired, and additional pneumatic volume is not a problem, the housing 502 can be easily configured to enlarge the internal volume of the cavity 522. This modification may be desired, for example, for a drain valve used with an adult ventilator, or in various non-medical applications.

One of the benefits of a drain valve in accordance with any of the embodiments of the subject invention is that it can be manufactured inexpensively. While all or some of the parts can be made of aluminum, stainless steel or other metals, all the parts, other than the springs, are preferably formed of suitable plastic material by well known processes, such as molding or extrusion. The springs preferably are made of a suitable metal, but certain plastics, or other resilient materials, may be found to be suitable. The economy of manufacture allows drain valves in accordance with the present invention to be disposable, thereby eliminating the need for sterilization.

The embodiments of the invention described above are the preferred embodiments, and variations and modifications will suggest themselves to those skilled in the pertinent arts, including some modifications and alternatives that have been suggested above. As an additional example, rather than having an inlet tube that can be connected to a tee, a tee could be integrally molded as part of the inlet tube, allowing the drain valve to be directly connected into a patient circuit. Also, while the invention has been described with respect to a human patient ventilator system, such a drain valve could be used in any pressurized gas system in which there is gas pressure cycling. These and other modifications that may suggest themselves to those skilled in the pertinent arts should be considered within the spirit and scope of the present invention, as defined in the claims that follow.

What is claimed is:

1. A drain valve for draining liquid from a pressurized gas system having a time-varying gas pressure, the valve comprising:

a housing defining an internal cavity bounded by a downstream wall, and having inlet means for fluidly connecting the cavity to a portion of the gas system that is subject to the time-varying gas pressure and for accumulating a volume of liquid flowing from the gas system, and outlet means for fluidly connecting the cavity to a source of ambient or subambient pressure;

inlet valving means in the cavity, movable between a first position for sealing the inlet means from the cavity when the total pressure in the inlet means, comprising the gas pressure in the inlet means plus the weight of the volume of liquid accumulated in the inlet means, is less than a predetermined actuation pressure value, and a second position for allowing fluid flow from the inlet means to the cavity in response to the total pressure in the inlet means reaching the actuation pressure value;

outlet valving means in the cavity, movable between a first position for sealing the outlet means from the cavity, and a second position for allowing fluid flow from the cavity to the outlet means; and valve biasing means for maintaining the outlet valving means in its first position when the inlet valving means is in its second position, and for allowing the outlet valving means to move to its second position for at least a substantial portion of the time that the inlet valving means is in its first position, wherein the inlet valving means and the outlet valving means are axially movable relative to each other, and wherein the biasing means comprises:

an inlet closure spring, seated between the inlet valving means and the outlet valving means so as to bias the inlet valving means and the outlet valving means away from each other, and so as to bias the inlet valving means toward its first position; and an outlet closure spring, seated between the outlet closure means and the downstream wall so as to bias the outlet valving means toward its second position.

2. The drain valve of claim 1, wherein the outlet valving means has an upstream side and a downstream side, and wherein the drain valve further comprises venting means for communicating pressure from the outlet means to the upstream side of the outlet valving means when the outlet valving means is in its second position.

3. The drain valve of claim 2, further comprising vent closure means for closing the venting means when the inlet valving means is in its second position.

4. The drain valve of claim 2, wherein the outlet valving means includes an outlet sealing portion, and wherein the venting means comprises passage means extending through the outlet valving means from the outlet means to the cavity upstream from the outlet sealing portion.

5. The drain valve of claim 1, wherein the inlet means includes an inlet passage in fluid communication with the cavity, wherein the inlet valving means includes an inlet valving member axially slidable between a first position and a second position relative to the inlet passage, and wherein the valving member, when in the first position, seals the inlet passage from the cavity so as to contain a volume of liquid within the inlet passage, and when in the second position, allows the flow of the volume of liquid into the cavity from the inlet passage.

6. The drain valve of claim 5, wherein the inlet valving member comprises a substantially cylindrical inlet valve body having a closed upstream end disposed toward the inlet passage, a hollow interior, and an open downstream end, and wherein the outlet valving means comprises:

a venting portion disposed within the open downstream end of the inlet valve body for slidable movement within the interior of the inlet valve body; and an outlet sealing portion downstream from the venting portion.

7. The drain valve of claim 6, wherein the inlet closure spring is disposed within the interior of the inlet valve body and seated between the venting portion of the outlet valving means and the upstream end of the inlet valve body, and wherein the outlet closure spring is seated between the outlet sealing portion and the downstream wall.

8. The drain valve of claim 5, wherein the outlet valving means has an upstream side and a downstream side, wherein the drain valve further comprises venting means for communicating pressure from the outlet means to the upstream side of the outlet valving means when the outlet valving means is in its second position, wherein the cavity is bounded by a downstream wall of the housing, and wherein the venting means includes passage means through the housing adjacent the downstream wall and communicating between the outlet means and the cavity.

9. The drain valve of claim 8, further comprising passage closure means for closing communication between the passage means and the cavity when the inlet valving means is in its second position, the passage closure means comprising a passage closure portion of the inlet valving means that seals the passage means from the cavity when the inlet valving means is in its second position.

10. The drain valve of claim 1, further comprising volume adjustment means for selectively varying the internal volume of the cavity.

11. A drain valve for draining liquid from a pressurized gas system having a time-varying gas pressure, the valve comprising:
  a housing defining an internal cavity, and having inlet means for fluidly connecting the cavity to a portion of the gas system that is subject to the time-varying gas pressure and for accumulating a volume of liquid flowing from the gas system, and outlet means for fluidly connecting the cavity to a source of ambient or subambient pressure;
  inlet valving means in the cavity, movable between a first position for sealing the inlet means from the cavity when the total pressure in the inlet means, comprising the gas pressure in the inlet means plus the weight of the volume of liquid accumulated in the inlet means, is less than a predetermined actuation pressure value, and a second position for allowing fluid flow from the inlet means to the cavity in response to the total pressure in the inlet means reaching the actuation pressure value;
  outlet valving means in the cavity, movable between a first position for sealing the outlet means from the cavity, and a second position for allowing fluid flow from the cavity to the outlet means;
  valve biasing means for maintaining the outlet valving means in its first position when the inlet valving means is in its second position, and for allowing the outlet valving means to move to its second position for at least a substantial portion of the time that the inlet valving means is in its first position; and
  volume adjustment means for selectively varying the internal volume of the cavity.

12. The drain valve of claim 11, wherein the outlet valving means and the inlet valving means are axially movable relative to each other, wherein the cavity is bounded by a downstream wall, and wherein the biasing means comprises:
  an inlet closure spring, seated between the inlet valving means and the outlet valving means so as to bias the inlet valving means and the outlet valving means away from each other, and so as to bias the inlet valving means toward its first position; and
  an outlet closure spring, seated between the outlet closure means and the downstream wall so as to bias the outlet valving means toward its second position.

13. The drain valve of claim 11, wherein the volume adjustment means comprises:
  a first housing portion defining a first cavity portion, and having an upstream end and a downstream end;
  a second housing portion defining a second cavity portion, and having an upstream end and a downstream end; and
  coupling means for adjustably coupling the downstream end of the first housing portion to the upstream end of the second housing portion so as to vary the combined internal volumes of the first and second cavity portions.

14. The drain valve of claim 13, wherein the coupling means comprises:
  a first threaded portion adjacent the downstream end of the first housing portion; and
  a second threaded portion, adjustably matable with the first threaded portion, adjacent the upstream end of the second housing portion.

15. A drain valve for draining liquid from a pressurized gas system having a time-varying gas pressure, the valve comprising:
  a housing defining an internal cavity, and having inlet means for fluidly connecting the cavity to a portion of the gas system that is subject to the time-varying gas pressure and for accumulating a volume of liquid flowing from the gas system, and outlet means for fluidly connecting the cavity to a source of ambient or subambient pressure;
  inlet valving means in the cavity, movable between a first position for sealing the inlet means from the cavity when the total pressure in the inlet means, comprising the gas pressure in the inlet means plus the weight of the volume of liquid accumulated in the inlet means, is less than a predetermined actuation pressure value, and a second position for allowing fluid flow from the inlet means to the cavity in response to the total pressure in the inlet means reaching the actuation pressure value;
  outlet valving means in the cavity, having an upstream side, a downstream side, and an outlet sealing portion, the outlet valving means being movable between a first position for sealing the outlet means from the cavity, and a second position for allowing fluid flow from the cavity to the outlet means, the inlet valving means and the outlet valving means being axially movable relative to each other;
  valve biasing means for maintaining the outlet valving means in its first position when the inlet valving means is in its second position, and for allowing the outlet valving means to move to its second position for at least a substantial portion of the time that the inlet valving means is in its first position;
  venting means for communicating pressure from the outlet means to the upstream side of the outlet valving means when the outlet valving means is in its second position, the venting means comprising passage means extending through the outlet valving means from the outlet means to the cavity upstream from the outlet sealing portion, the passage means including a vent aperture in the outlet valving means communicating with the cavity; and
  vent closure means for closing the passage means from the cavity when the inlet valving means is in its second position, the vent closure means comprising a vent closure portion of the inlet valving means that closes the vent aperture when the inlet valving means is in its second position.

* * * * *